US008572186B2

(12) United States Patent  (10) Patent No.: US 8,572,186 B2
Okada  (45) Date of Patent: Oct. 29, 2013

(54) GATEWAY DEVICE, METHOD FOR CONTROLLING THE SAME, AND PROGRAM STORAGE MEDIUM ARRANGED TO RELAY TRANSMISSION AND RECEPTION OF E-MAILS

(75) Inventor: Kazuhiro Okada, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 945 days.

(21) Appl. No.: 12/142,939

(22) Filed: Jun. 20, 2008

(65) Prior Publication Data

US 2009/0055493 A1 Feb. 26, 2009

(30) Foreign Application Priority Data

Aug. 24, 2007 (JP) ................. 2007-217869

(51) Int. Cl.
*G06F 15/16* (2006.01)
(52) U.S. Cl.
USPC ........................ 709/206; 709/218; 709/219
(58) Field of Classification Search
USPC ........................................................ 709/206
See application file for complete search history.

(56) References Cited

U.S. PATENT DOCUMENTS

| 6,351,771 | B1 * | 2/2002 | Craddock et al. ............. 709/227 |
| 6,684,088 | B1 * | 1/2004 | Halahmi ....................... 455/566 |
| 6,735,618 | B1 * | 5/2004 | Niwa ............................ 709/207 |
| 7,035,633 | B2 * | 4/2006 | Kirkpatrick ............... 455/426.1 |
| 7,227,922 | B2 * | 6/2007 | Klaghofer et al. ............ 375/377 |
| 2001/0013056 | A1 * | 8/2001 | Mori et al. ..................... 709/206 |
| 2002/0119804 | A1 * | 8/2002 | Gomes et al. ................. 455/557 |
| 2002/0133554 | A1 * | 9/2002 | Checkoway et al. .......... 709/206 |
| 2002/0143883 | A1 * | 10/2002 | Miyake et al. ................ 709/206 |
| 2002/0152274 | A1 * | 10/2002 | Shino ............................ 709/206 |
| 2003/0093565 | A1 * | 5/2003 | Berger et al. ................. 709/246 |
| 2003/0193568 | A1 * | 10/2003 | Yoshida et al. ............ 348/207.1 |
| 2004/0105121 | A1 * | 6/2004 | Taniguchi et al. ........... 358/1.15 |
| 2005/0044158 | A1 * | 2/2005 | Malik .......................... 709/206 |
| 2006/0053278 | A1 * | 3/2006 | Tanimoto et al. ............. 713/150 |
| 2006/0172264 | A1 * | 8/2006 | Eskew et al. .................... 434/38 |
| 2006/0192990 | A1 * | 8/2006 | Tonegawa .................... 358/1.15 |
| 2006/0212528 | A1 * | 9/2006 | Tonegawa .................... 709/206 |
| 2006/0221959 | A1 * | 10/2006 | Sumiyoshi .................... 370/389 |

(Continued)

FOREIGN PATENT DOCUMENTS

JP 2000-183951 A 6/2000
JP 2000-349808 A 12/2000

(Continued)

OTHER PUBLICATIONS

Tanaka et al., "Messaging Platform Niyoru Arcstar Mobile Service", NTT Gijutsu Journal, vol. 13, No. 3, Mar. 1, 2001, pp. 25-29.

(Continued)

*Primary Examiner* — Ian N Moore
*Assistant Examiner* — Dung B Huynh
(74) *Attorney, Agent, or Firm* — Keating & Bennett, LLP

(57) ABSTRACT

A method for controlling a gateway device arranged between a client terminal and a server, and arranged to relay transmission and reception of e-mails, includes the steps of receiving a first e-mail stored in the server, converting the first e-mail into a second e-mail for temporary storage, transmitting the second e-mail to the client terminal, and managing information on the first e-mail and second e-mail.

18 Claims, 7 Drawing Sheets

(56) References Cited

U.S. PATENT DOCUMENTS

| | | | |
|---|---|---|---|
| 2008/0174829 A1* | 7/2008 | Nuaimi et al. | 358/407 |
| 2009/0024561 A1* | 1/2009 | Palanisamy | 707/1 |
| 2009/0172119 A1* | 7/2009 | Eriksson | 709/206 |
| 2011/0026711 A1* | 2/2011 | Almeida | 380/259 |
| 2012/0166567 A1* | 6/2012 | Halahmi et al. | 709/206 |

FOREIGN PATENT DOCUMENTS

| | | | |
|---|---|---|---|
| JP | 2001-237872 A | 8/2001 |
| JP | 2002-223253 A | 8/2002 |
| JP | 2003-099365 A | 4/2003 |
| JP | 2005-346334 A | 12/2005 |
| JP | 2006-174163 A | 6/2006 |
| JP | 2006-244318 A | 9/2006 |
| JP | 2006-261991 A | 9/2006 |
| JP | 2006-277402 A | 10/2006 |

OTHER PUBLICATIONS

Official communication issued in the counterpart Japanese Application No. 2007-217869, mailed on Jun. 23, 2009.

Official Communication issued in corresponding Japanese Patent Application No. 2007-217869, mailed on Sep. 8, 2009.

* cited by examiner

FIG. 4B

| LIST NUMBER | UID NUMBER | BYTE COUNT BEFORE CONVERSION | BYTE COUNT AFTER CONVERSION |
| --- | --- | --- | --- |
| 1 | UID 123 | 10 | 7 |
| 2 | UID 124 | 20 | 14 |
| 3 | UID 125 | 5 | |
| 4 | UID 126 | 15 | |
| 5 | UID 127 | 10 | |

FIG. 4C

| LIST NUMBER | UID NUMBER | BYTE COUNT BEFORE CONVERSION | BYTE COUNT AFTER CONVERSION |
|---|---|---|---|
| 1 | UID 123 | 10 | 7 |
| 2 | UID 124 | 20 | 14 |
| 3 | UID 125 | 5 | 3 |
| 4 | UID 126 | 15 | 10 |
| 5 | UID 127 | 10 | |

FIG. 4D

| LIST NUMBER | UID NUMBER | BYTE COUNT BEFORE CONVERSION | BYTE COUNT AFTER CONVERSION |
|---|---|---|---|
| 2 | UID 124 | 20 | 14 |
| 3 | UID 125 | 5 | 3 |
| 4 | UID 126 | 15 | 10 |
| 5 | UID 127 | 10 | |

GATEWAY DEVICE, METHOD FOR CONTROLLING THE SAME, AND PROGRAM STORAGE MEDIUM ARRANGED TO RELAY TRANSMISSION AND RECEPTION OF E-MAILS

CROSS-REFERENCE TO RELATED APPLICATION

This application claims priority under 35 U.S.C. 119 to Japanese Patent Application No. 2007-217869, filed on Aug. 24, 2007, which application is hereby incorporated by reference in its entirety.

BACKGROUND OF THE INVENTION

1. Field of the Invention

The present invention relates to a gateway device arranged to relay transmission and reception of electronic mails (e-mails) and, in particular, relates to a processing technique for transmitting and receiving the e-mails by the gateway device.

2. Description of the Related Art

A gateway device that is arranged between a client and a server and that relays transmission and reception of e-mails is well known. Some gateway devices of this type include a function for encrypting/decrypting the e-mails.

The conventional gateway device includes a storage unit that stores the e-mails. In order to store a large number of e-mails, the storage unit preferably has a large capacity. However, as the capacity of the storage unit increases, a substantial storage with a large capacity is required, thereby affecting the production cost and management cost. Accordingly, a gateway device including a storage unit that shows good performance in spite of a small capacity and that requires only a small storage has been desired.

SUMMARY OF THE INVENTION

In order to overcome the problems described above, preferred embodiments of the present invention provide a small, lightweight, and high-performance gateway device that requires only a small storage.

One preferred embodiment of the present invention provides a gateway device that is arranged between a client terminal and a server and that relays transmission and reception of e-mails. Moreover, the gateway device includes a unit arranged to receive a first e-mail stored in the server, a unit arranged to convert the first e-mail into a second e-mail for temporary storage, a unit arranged to transmit the second e-mail to the client terminal, and a management table arranged to manage information on the first e-mail and information on the second e-mail.

According to a preferred embodiment of the present invention, at least a sequence number of the first e-mail, an identification number of the first e-mail, and information regarding a data capacity of the second e-mail are recorded in the management table.

According to a preferred embodiment of the present invention, the identification number is a unique ID that specifies the first e-mail managed in the server or a number that is associated with the unique ID.

According to a preferred embodiment of the present invention, after transmitting the second e-mail to the client terminal, the second e-mail is deleted.

A preferred embodiment of the present invention provides a unit that limits the sum of a capacity of the first e-mails that can be received at one time.

According to a preferred embodiment of the present invention, when the capacity of a single first e-mail exceeds the limited sum, the first e-mail is received regardless of such limit.

According to a preferred embodiment of the present invention, when a request for receiving the second e-mail is received from the client terminal, a connection is established between the gateway device and the client terminal, and while the connection is maintained, the first e-mail received from the server is converted into the second e-mail and then transferred to the client terminal.

According to the various preferred embodiments of the present invention, even when a capacity of the mail storage unit is small, the transmission and reception of the e-mails can be performed without any trouble. Accordingly, it is not necessary to provide a substantial storage with a large capacity, thereby reducing a size and weight of the gateway device.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4B illustrates content of the management table in a prescribed step of FIG. 2.

FIG. 4C illustrates content of the management table in a prescribed step of FIG. 3.

FIG. 4D illustrates content of the management table in a prescribed step of FIG. 3.

DETAILED DESCRIPTION OF PREFERRED EMBODIMENTS

Figure 1:
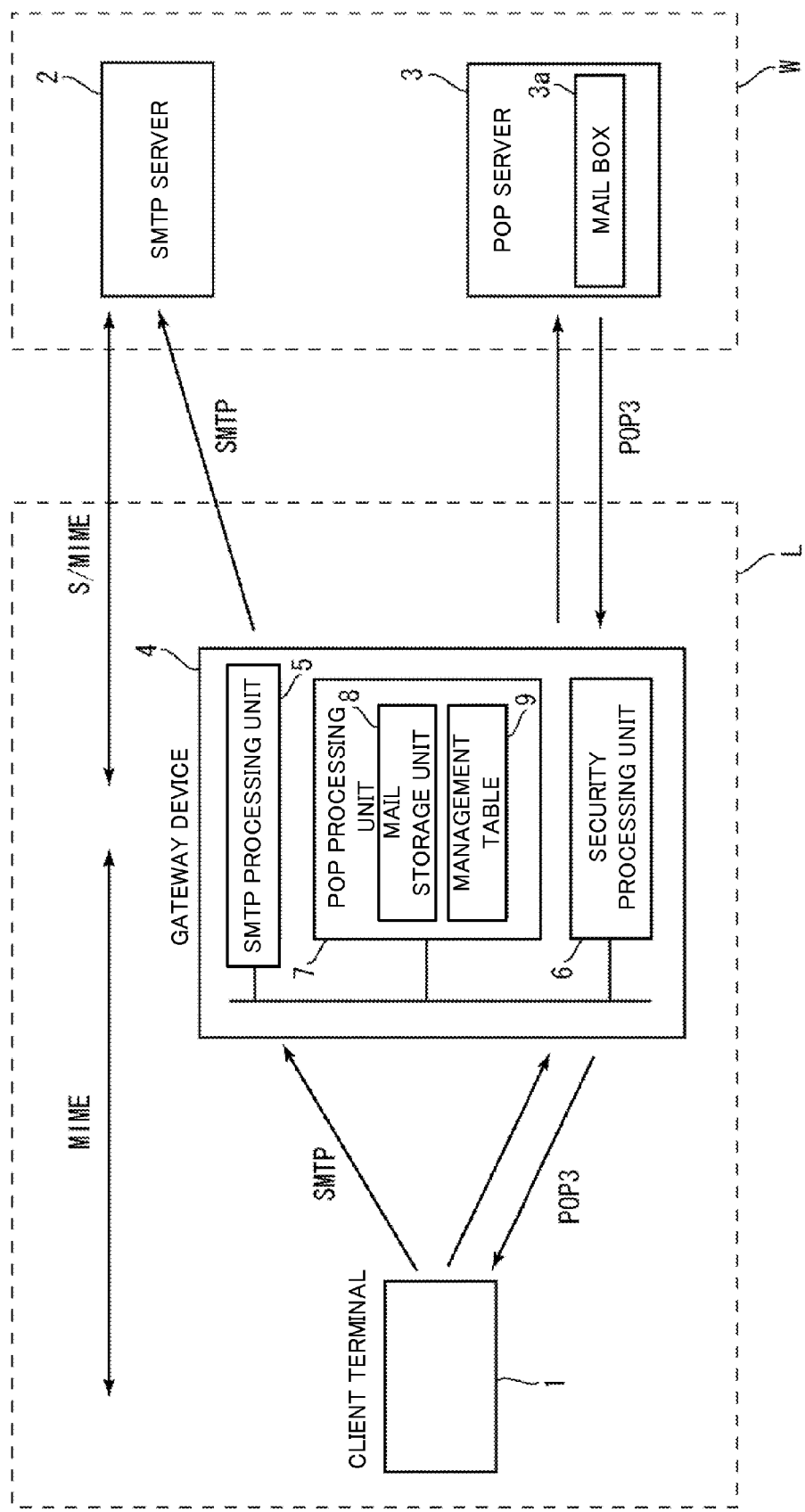
FIG. 1 illustrates an e-mail communication system including a gateway device according to a first preferred embodiment of the present invention.

With reference to the drawings, preferred embodiments of the present invention will be described. FIG. 1 illustrates an e-mail communication system in which a client terminal 1 transmits/receives e-mails to/from another outside client terminal or the like via a gateway device 4 according to a preferred embodiment of the present invention. As illustrated in FIG. 1, the e-mail communication system according to the present preferred embodiment includes the client terminal 1, a Simple Mail Transfer Protocol (SMTP) server 2, a Post Office Protocol (POP) server 3, and the gateway device 4, etc.

The gateway device 4 is connected with the client terminal 1, the SMTP server 2, and the POP server 3 via a network. The gateway device 4 relays the transmission/reception of the e-mails between the client terminal 1 and the SMTP server 2, and/or between the client terminal 1 and the POP server 3. In FIG. 1, reference symbol "L" denotes a Local Area Network (LAN) and reference symbol "W" denotes a Wide Area Network (WAN).

The gateway device 4 has a function for converting a protocol between Multipurpose Internet Mail Extensions (MIME) and Secure MIME (S/MIME). An unencrypted MIME e-mail is processed between the gateway device 4 and the client terminal 1, and an encrypted S/MIME e-mail (encrypted e-mail) is processed between the gateway device 4 and the SMTP server 2 or the POP server 3.

By using an SMTP protocol, the client terminal 1 executes a process of transmitting the unencrypted plain-text e-mail to the gateway device 4. By using a POP3 protocol, the client terminal 1 also executes a process of receiving a decrypted e-mail from the gateway device 4. The client terminal 1 may be a personal computer or a digital multifunction peripheral or the like. Generally, a plurality of client terminals are arranged to transmit/receive the e-mails to/from the gateway device 4.

The SMTP server 2 uses the SMTP protocol, for example, to receive the encrypted e-mail from the gateway device 4 and transfer the received encrypted e-mail to a transmission destination.

The POP server 3 includes a mail box 3a, and for example, stores in the mail box 3a, which is created with respect to each user, the e-mail transmitted to the user of the client terminal 1. Then, when a request is received from the gateway device 4, by using the POP3 protocol, the POP server 3 executes a process of transferring the e-mail (a first e-mail) such as the encrypted e-mail stored in the mail box 3a to the gateway device 4. In the present preferred embodiment, the SMTP server 2 and the POP server 3 are separately described, however, a single server that includes both servers may be provided.

The gateway device 4 includes an SMTP processing unit 5, a security processing unit 6, and a POP processing unit 7, etc. A storage provided in the gateway device 4 is sufficiently small compared with a conventional gateway device, and thus, the gateway device 4 is reduced in size and weight.

The SMTP processing unit 5 executes an overall process regarding the transmission of the e-mails transmitted from the client terminal 1. More specifically, when the plain-text e-mail is received from the client terminal 1, the SMTP processing unit 5 executes, in cooperation with the security processing unit 6, a process of encrypting the received e-mail to generate the encrypted e-mail; a process of providing an electronic signature to the generated encrypted e-mail; and a process of transmitting the encrypted e-mail to the SMTP server 2. In addition, the SMTP processing unit 5 executes a process of transmitting the plain-text e-mail without encrypting the same to the SMTP server 2, and a process of transmitting the encrypted e-mail without providing the electronic signature to the same to the SMTP server 2, or the like.

In cooperation with the SMTP processing unit 5 and the POP processing unit 7, the security processing unit 6 executes a process of encrypting the e-mail to be transmitted to the SMTP server 2 to generate the encrypted e-mail; a process of providing an electronic signature to the generated encrypted e-mail; and a process of decrypting the encrypted e-mail received from the POP server 3. In addition, the security processing unit 6 includes a function for verifying the electronic signature and an electronic certificate both included in the e-mail received from the POP server 3. Moreover, the security processing unit 6 stores the electronic certificate and a private key (not illustrated) of a user at a communication destination and of the user of the client terminal 1, and executes the process of encryption/decryption by using the electronic certificate and the private key.

The POP processing unit 7 executes an overall process regarding the reception of the e-mail to be transmitted to the client terminal 1. More specifically, by using the POP3 protocol, the POP processing unit 7 executes a process of receiving the encrypted e-mail from the POP server 3; a process of decrypting, in cooperation with the security processing unit 6, the encrypted e-mail received from the POP server 3 to generate the plain-text e-mail; and a process of transferring the e-mail in response to a request from the client terminal 1. In addition, the POP processing unit 7 executes a process of transferring the plain-text e-mail received from the POP server 3 directly to the client terminal 1.

The POP processing unit 7 includes a mail storage unit 8 and a management table 9. The mail storage unit 8 converts the first e-mail of S/MIME format received from the POP server 3 into the e-mail (second e-mail) of MIME format for temporary storage. When the first e-mail has been encrypted, the e-mail after the decryption is stored as the second e-mail. The management table 9 includes information on the first e-mail and the second e-mail, and is used for the transmission/reception of the e-mail. The detailed description thereof will be made below.

The POP processing unit 7 also includes a unit arranged to limit the sum of a capacity of the first e-mails that can be received at one time. In other words, an upper limit of a total amount of data capacity of the first e-mails that can be acquired by one request for receiving the e-mails can be set. Accordingly, when the total amount of data capacity of the first e-mails required to be received exceeds the upper limit, the first e-mails that have exceeded the upper limit are received at the time of the next request for receiving the e-mails. Alternatively, the data capacity of the first e-mails may be indirectly limited by an upper limit of data capacity of the second e-mails. Thus, by setting the prescribed limit before the physically limited capacity is reached, the e-mail receiving process can be performed stably and reliably with the storage having a small capacity. However, when a single first e-mail exceeds the set upper limit of the total amount of data capacity, the receiving process cannot be directly performed. Therefore, the receiving process is performed only on an exceptional basis.

Next, the receiving process of the e-mails in the above-described e-mail communication system will be described in detail.

As described above, the capacity of the storage provided in the gateway device 4 is sufficiently small compared with the conventional gateway device. Accordingly, since a number of e-mails that can be stored in the mail storage unit 8 is decreased, a configuration cannot be adopted in which a communication process between the gateway device 4 and the POP server 3 and a communication process between the gateway device 4 and the client terminal 1 are separately performed in the e-mail receiving process. Therefore, in the present preferred embodiment, in order to perform the processes without any trouble even when the number of e-mails stored in the mail storage unit 8 is small, a process is adopted in which the communication is continuously performed in one session between the client terminal 1 and the gateway device 4 and between the gateway device 4 and the POP server 3 in conjunction with the request from the client terminal 1 for receiving the e-mails.

However, if the above-described continuous communication process is adopted, for example, a problem occurs on the protocol when the client terminal 1 is set to store the e-mails in the POP server 3.

For example, when the client terminal 1 transmits the request for receiving the e-mails to the gateway device 4, a command such as a STAT command and a LIST command is transmitted to the gateway device 4. In response to such commands, the gateway device 4 needs to return a storage number of the second e-mails and the data capacity of the second e-mails to the client terminal 1. However, since the second e-mails that can be stored in the mail storage unit 8 are few, a problem is that such information cannot be acquired and directly returned. It is possible for the gateway device 4 to access the POP server 3 and acquire the information each time, however, overload on the processes such as the decrypting process of the encrypted e-mails increases, preventing the appropriate processes.

Accordingly, the gateway device 4 is provided with the management table 9, and the communication process is performed while managing the e-mails by using the management table 9.

Figure 2:
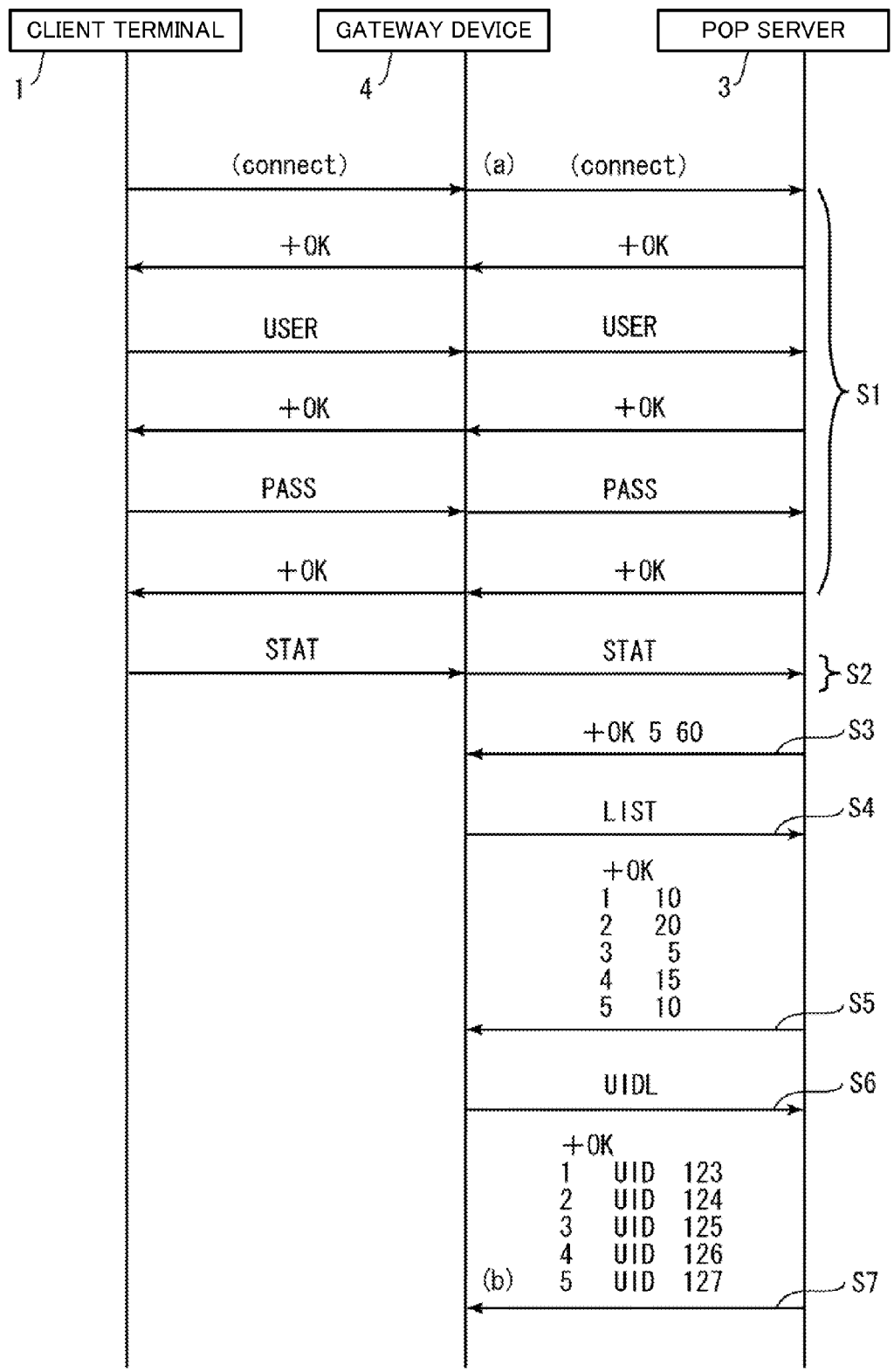
FIG. 2 is a sequence diagram of an e-mail receiving process according to the first preferred embodiment of the present invention.
Figure 3:
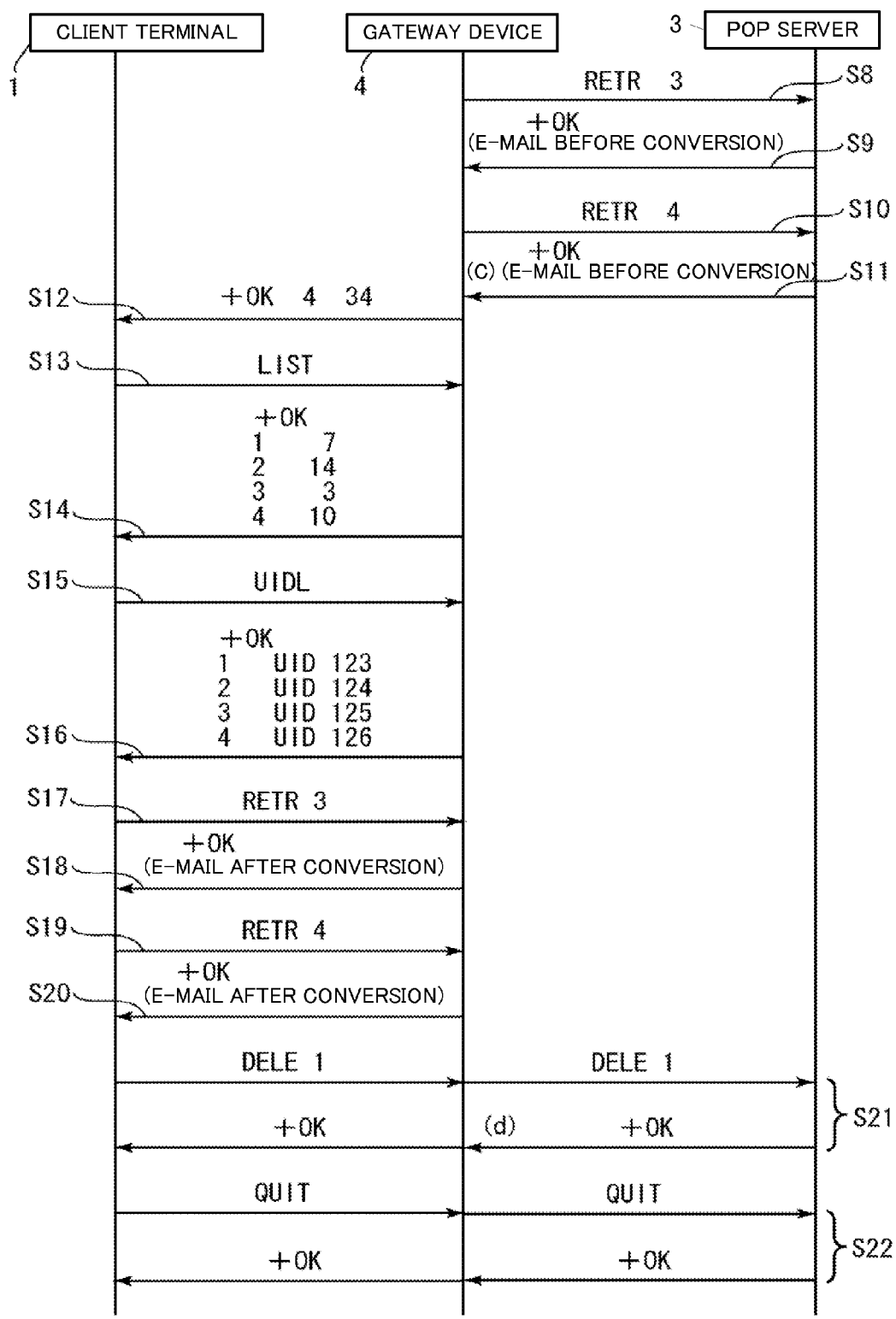
FIG. 3 is a sequence diagram of the e-mail receiving process following FIG. 2.

FIGS. 2 and 3 illustrate an example of a sequence in the e-mail receiving process. FIG. 3 illustrates the sequence following the sequence of FIG. 2. FIGS. 4A through 4D illustrate content of the management table 9 in some of the steps illustrated in FIGS. 2 and 3.

Figure 4A:
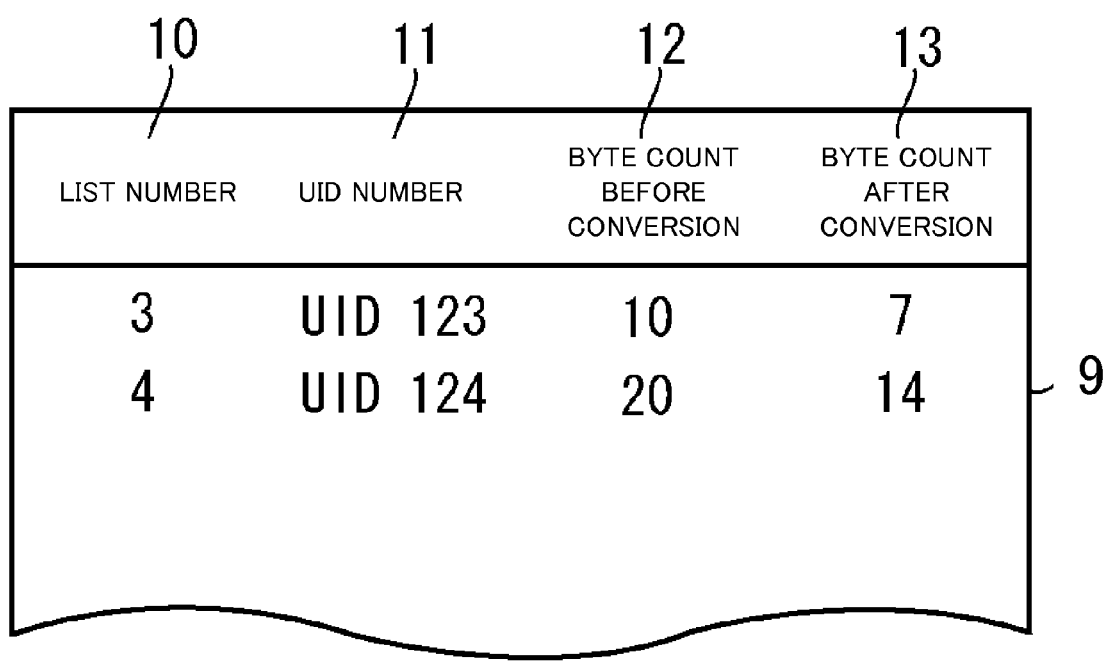
FIG. 4A illustrates content of a management table in a prescribed step of FIG. 2.

For example, the management table 9 in FIG. 4A illustrates a step (a) of FIG. 2, that is, the content before the series of communication processes is started. FIG. 4B illustrates the content of the management table in a step (b) of FIG. 2. FIG. 4C illustrates the content of the management table in a step (c) of FIG. 3. FIG. 4D illustrates the content of the management table in a step (d) of FIG. 3. The management table 9 is created with respect to each e-mail address of the user, and is structured as an e-mail management database.

As illustrated in FIGS. 4A through 4D, the management table 9 includes data items such as a LIST number (e-mail number) 10, a UID number (ID number) 11, a byte count before conversion 12, and a byte count after conversion 13 which are transmitted and received under the POP3 protocol. The LIST number 10 corresponds to the LIST command, which requires a data list of the first e-mails stored in the mail box 3a, and is a sequence number that is allotted to each of the first e-mails each time the LIST command is transmitted. The UID number 11 corresponds to a Unique ID Listing (UIDL) command, and is a unique ID number allotted to each of the first e-mails. The byte count before conversion 12 indicates the data capacity of each of the first e-mails. The byte count after conversion 13 indicates the data capacity of the second e-mail of MIME format converted from the first e-mail of S/MIME format. The data capacity of each e-mail in the present preferred embodiment is expressed in a small number for convenience of description, however, the data capacity is generally expressed in a larger number.

Information on the previous communication is recorded in the management table 9 of FIG. 4A. Specifically, it is illustrated in FIG. 4A that each e-mail of UID numbers 123 and 124 with the LIST numbers 3 and 4 allotted respectively is stored in the mail box 3a of the pop server 3, and that the data capacity of each e-mail before and after the conversion is also recorded.

In FIG. 2, when the request for receiving the e-mails is instructed by the client terminal 1, the gateway device 4 relays each command regarding certification between the client terminal 1 and the POP server 3 (step S1). When each step of the certification is completed, a series of processes regarding calling of the e-mail is executed.

The gateway device 4 receives the STAT command from the client terminal 1 and transfers the same to the POP server 3 (step S2). In response to the STAT command, the POP server 3 returns to the gateway device 4 a message including a number and overall byte count of the first e-mails in the mail box 3a (step S3). For example, "+OK 5 60" in the drawing indicates that the number of first e-mails is "5", and that the overall byte count is "60".

Next, the gateway device 4 transmits the LIST command to the POP server 3 (step S4). In response to the LIST command, the POP server 3 returns to the gateway device 4 a message including listed data of the LIST number and the byte count of the first e-mail (step S5). For example, "1 10" in the drawing indicates that the byte count of the first e-mail of LIST number "1" is "10".

Then, the gateway device 4 transmits the UIDL command to the POP server 3 (step S6). In response to the UIDL command, the POP server 3 returns to the gateway device 4 a message including listed data of the LIST number and the UID number corresponding to the LIST number (step S7). The content of the management table 9 at this time is illustrated in FIG. 4B. As illustrated in FIG. 4B, new LIST numbers are allotted, and the information on the first e-mails of LIST numbers 3, 4, 5, which have not been received yet, is added. Accordingly, the gateway device 4 can specify that the first e-mails of UID numbers 125 through 127 have been newly stored in the POP server 3. As described above, the UID number managed by the POP server 3 is recorded in the management table 9 as an identification number of the first e-mail. Thus, in response to the request from the client terminal 1, the gateway device 4 can execute a process (for example, a deleting process) with respect to the first e-mail individually stored in the POP server 3. Alternatively, a number associated with the UID managed by the POP server 3 may be recorded in the management table 9 as the identification number of the first e-mail.

As illustrated in FIG. 3, in order to acquire the byte count after conversion of the e-mail of LIST number 3, the gateway device 4 transmits a RETR command for acquiring the first e-mail of LIST number 3 to the POP server 3 (step S8). In response to the RETR command, the POP server 3 transmits the first e-mail of LIST number 3 to the gateway device 4 (step S9). Similarly, the gateway device 4 transmits the RETR command (step S10) and receives the first e-mail of LIST number 4 from the POP server 3 (step S11).

Subsequently, the acquiring process of the first e-mail is similarly executed. Normally, the acquiring process of the first e-mail of LIST number 5 is supposed to be executed, however, it is assumed here that the upper limit of the sum of data capacity of the first e-mails that can be received at a time has been set below 50 bytes, for example. In this case, if the first e-mail of LIST number 5 is received, the upper limit will be exceeded. Therefore, the gateway device 4 does not execute the acquiring process of the first e-mail of LIST number 5. The first e-mail of LIST number 5 is received at the time of the next request for receiving the e-mails. The content of the management table 9 at this time is illustrated in FIG. 4C. As illustrated in FIG. 4C, since the first e-mails of LIST numbers 3 and 4 are acquired, and the second e-mails are stored in the mail storage unit 8, the byte counts after conversion of the first e-mails of LIST numbers 3 and 4 are newly recorded.

Next, in response to the STAT command received in step S2, the gateway device 4 returns to the client terminal 1 a message including a number of second e-mails in the mail storage unit 8 and an overall byte count (step S12).

Then, the client terminal 1 transmits the LIST command to the gateway device 4 (step S13). In response to the LIST command, the gateway device 4 returns to the client terminal 1 a message including listed data of LIST numbers and byte count of the second e-mails stored in the mail storage unit 8 (step S14).

The client terminal 1 then transmits the UIDL command to the gateway device 4 (step S15). In response to the UIDL command, the gateway device 4 returns to the client terminal 1 a message including listed data of LIST numbers of the second e-mails stored in the mail storage unit 8 and UID numbers corresponding to the LIST numbers (step S16).

Accordingly, the client terminal 1 learns that the second e-mails of UID numbers 125 and 126 have been newly stored in the mail storage unit 8, and transmits the RETR command to the gateway device 4 to acquire the second e-mails of LIST numbers 3 and 4 (steps S17 through S20).

At this time, the second e-mails of LIST numbers 3 and 4 in the mail storage unit 8 are deleted, and the second e-mails are not maintained in the mail storage unit 8. Instead, prescribed information (information regarding the capacity of the second e-mail) is stored in the management table 9 as a record, and when a request for the information is made from the client terminal 1, a response thereto is made by using the management table 9.

In other words, except for temporarily storing the second e-mails in the series of communication processes of the session, the gateway device 4 does not maintain the second e-mails, and stores only the prescribed information required for those communication processes in the management table 9. Thus, the capacity of storage can be reduced without causing any problem in the communication. In response to the request from the client terminal 1, only when necessary information is not in the management table 9, the gateway device 4 has only to access the POP server 3, and thus, the overload on the communication can be reduced. More specifically, the gateway device 4, which has received the request from the client terminal 1 for receiving the e-mails, establishes a session with the client terminal 1. While the session is maintained with the client terminal 1, the gateway device 4 receives the first e-mail from the POP server 3. Moreover, while the session is maintained, the gateway device 4 converts the received first e-mail into the second e-mail, and transmits the second e-mail to the client terminal 1. Then, after transmitting the second e-mail to the client terminal 1, the gateway device 4 deletes the second e-mail. Accordingly, a storage with a large capacity for storing the second e-mails becomes unnecessary in the gateway device 4.

The next step shows a case in which the client terminal 1 executes a process of deleting the e-mail of LIST number 1. The gateway device 4 receives a DELE command from the client terminal 1, transfers the command to the POP server 3, receives a response from the POP server 3, and transfers the response to the client terminal 1 (step S21). The content of the management table 9 of this time is illustrated in FIG. 4D. As illustrated in FIG. 4D, when the first e-mail of LIST number 1 is deleted from the mail box 3a, the management table 9 is updated, and relative information is also deleted.

When a QUIT command for ending the session is received from the client terminal 1, the gateway device 4 transfers the command to the POP server 3, receives a response from the POP server 3, and transfers the response to the client terminal 1 (step S22). Thus, the series of communication processes is completed.

As described above, according to the gateway device 4 in the preferred embodiments of the present invention, even when the capacity of the mail storage unit 8 is small, the transmission and reception of the e-mails can be performed without any trouble. Thus, substantial storage with a large capacity is not necessary, and the gateway device 4 can be reduced in size and weight.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A gateway device arranged between a client terminal and a server, and arranged to relay transmission and reception of e-mails, the gateway device comprising:
   a receiving device arranged to receive first e-mails stored in the server;
   a converting device arranged to convert the first e-mails into second e-mails for temporary storage;
   a transmitting device arranged to transmit the second e-mails to the client terminal; and
   a management table arranged to manage information about the first e-mails and the second e-mails; wherein
   when the gateway device receives a request from the client terminal to receive the second e-mails, the gateway device sends a request to the server and receives the first e-mails from the server with the receiving device and establishes a connection with the client terminal, and while the connection is maintained, the first e-mails received from the server are converted into the second e-mails by the converting device and transmitted to the client terminal by the transmitting device; and
   when the gateway device receives a STAT command from the client terminal, the gateway device transfers the STAT command to the server, receives from the server a message including a total byte count of the first e-mails stored in the server, and returns to the client terminal a message including a total byte count of the second e-mails which are converted from the first e-mails.

2. The gateway device according to claim 1, wherein the management table stores at least a sequence number of the first e-mails, an identification number of the first e-mails, and information regarding a data capacity of the second e-mails.

3. The gateway device according to claim 1, wherein the management table stores at least an identification number of the first e-mails, and the identification number is a unique ID for specifying the first e-mails managed by the server, or a number that is associated with the unique ID.

4. The gateway device according to claim 2, wherein the identification number is a unique ID for specifying the first e-mails managed by the server, or a number that is associated with the unique ID.

5. The gateway device according to claim 3, wherein after transmitting the second e-mails to the client terminal, the gateway device deletes the second e-mails.

6. The gateway device according to claim 5, further comprising a unit arranged to limit a sum of a capacity of the first e-mails that can be received at one time.

7. The gateway device according to claim 6, wherein when the capacity of a single one of the first e-mails exceeds the limited sum, the single one of the first e-mails is received regardless of the limit.

8. A method for controlling a gateway device arranged between a client terminal and a server, and arranged to relay transmission and reception of e-mails, the method comprising the steps of:
   receiving first e-mails stored in the server;
   converting the first e-mails into second e-mails for temporary storage;
   transmitting the second e-mails to the client terminal; and
   managing information about the first e-mails and the second e-mails; wherein when the gateway device receives a request from the client terminal to receive the second e-mails, the gateway device sends a request to the server and receives the first e-mails from the server, establishes a connection with the client terminal, and while the connection is maintained, the first e-mails received from the server are converted into the second e-mails and transmitted to the client terminal; and when the gateway device receives a STAT command from the client terminal, the gateway device transfers the STAT command to the server, receives from the server a message including a total byte count of the first e-mails stored in the server and returns to the client terminal a message including a total byte count of the second e-mails which are converted from the first e-mails.

9. The method for controlling the gateway device according to claim 8, further comprising the step of limiting the sum of a capacity of a plurality of the first e-mails that can be received at one time.

10. The method for controlling the gateway device according to claim 9, wherein when the capacity of a single one of the first e-mails exceeds the limited sum, the single one of the first e-mails is received regardless of the limit.

11. A non-transitory digital storage medium having electronically readable control data stored thereon and adapted to cooperate with a programmable computing device such that the programmable computing device performs the method of claim 8.

12. A gateway device arranged between a client terminal and a server, and arranged to relay transmission and reception of e-mails, the gateway device comprising:
a receiving unit arranged to receive first e-mails stored in the server;
a mail storage unit arranged to convert the first e-mails into second e-mails for temporary storage;
a transmitting unit arranged to transmit the second e-mails to the client terminal; and
a management table arranged to manage information about the first e-mails and the second e-mails; wherein when the gateway device receives a request from the client terminal to receive the second e-mails, the gateway device sends a request to the server and receives the first e-mails from the server with the receiving unit and establishes a connection with the client terminal, and while the connection is maintained, the first e-mails received from the server are converted into the second e-mails by the mail storage unit and transmitted to the client terminal; and when the gateway device receives a STAT command from the client terminal, the gateway device transfers the STAT command to the server, receives from the server a message including a total byte count of the first e-mails stored in the server and returns to the client terminal a message including a total byte count of the second e-mails which are converted from the first e-mails.

13. The gateway device according to claim 12, wherein the management table stores at least a sequence number of the first e-mails, an identification number of the first e-mails, and information regarding a data capacity of the second e-mails.

14. The gateway device according to claim 13, wherein the identification number is a unique ID for specifying the first e-mails managed by the server, or a number that is associated with the unique ID.

15. The gateway device according to claim 12, wherein the management table stores at least an identification number of the first e-mails, and the identification number is a unique ID for specifying the first e-mails managed by the server, or a number that is associated with the unique ID.

16. The gateway device according to claim 15, wherein after transmitting the second e-mails to the client terminal, the gateway device deletes the second e-mails.

17. The gateway device according to claim 16, further comprising a unit arranged to limit a sum of a capacity of the first e-mails that can be received at one time.

18. The gateway device according to claim 17, wherein when the capacity of a single one of the first e-mails exceeds the limited sum, the single one of the first e-mails is received regardless of the limit.

* * * * *